United States Patent

[11] 3,546,419

[72] Inventor Engelbert A. Meyer
    Union Lake, Michigan
[21] Appl. No. 369,115
[22] Filed May 21, 1964
[45] Patented Dec. 8, 1970
[73] Assignee Warren Fastener Corporation
    Mt. Clemens, Michigan
    a corporation of Michigan

[54] SELF-LOADING STUD WELDING APPARATUS
    4 Claims, 7 Drawing Figs.
[52] U.S. Cl. .................................................... 219/98
[51] Int. Cl. .................................................... B23k 9/20
[50] Field of Search .......................................... 219/95-
    —99, 78—80, 85, 103; 221/156, 163, 171, 175,
    278, 312; 193/25, 43; 198/43, 45, 48, 50; 219/98

[56] References Cited
    UNITED STATES PATENTS
    3,073,947  1/1963  Mortensen et al. ............  219/98
    3,371,184  2/1968  Napoli ...........................  219/98
    2,537,989  1/1951  Graham .........................  219/78
    2,905,803  9/1959  Brady ............................  219/79
    3,047,193  7/1962  Broderson ......................  221/200X
    FOREIGN PATENTS
    931,557  8/1955  Germany .......................  221/278

806,526  12/1958  Great Britain ................  219/98

Primary Examiner—R. F. Staubly
Attorney—Burton and Parker

ABSTRACT: In a self-loading gun for welding buttons or the like to metal surfaces, a gun body, an electrode mounted in the body for reciprocal movement having a projecting button holding forward end portion, a manifold block supported in spaced relation to said gun body having a longitudinal bore therethrough accommodating said electrode forward end and a transverse button passage communicating with said bore intermediate opposite ends of the latter, button delivery means for delivering buttons to said button passage, motive means on the gun body coupled to said electrode through a lost motion connection intermediate the gun body and the manifold block operable to shift the electrode between a forward welding position and a rearward button loading position adjacent said passage, a solenoid on the gun body coupled to said electrode means operable independently of said motive means to momentarily retract the same to strike an arc between a button carried thereby and a metal surface to which the button is to be welded, means on the gun body for plunging the button against said metal surface after retraction by said solenoid, and control means coupled to said gun and to said motive means causing the latter to shift the electrode rearwardly to load a button thereon and thence forwardly to dispose the button at a welding position upon the expiration of each welding cycle.

INVENTOR.
ENGELBERT A. MEYER
BY
Burton & Parker
ATTORNEYS

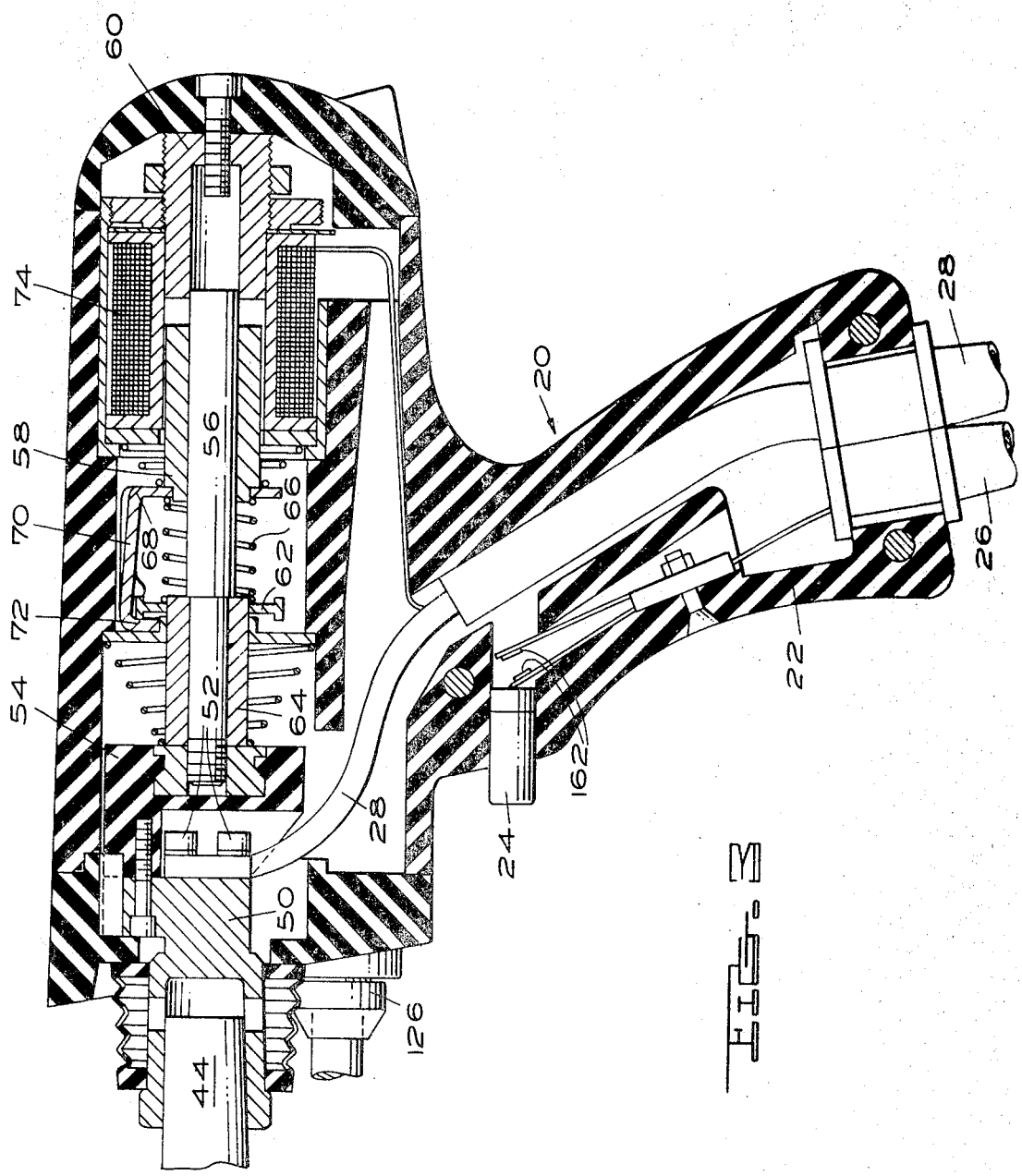

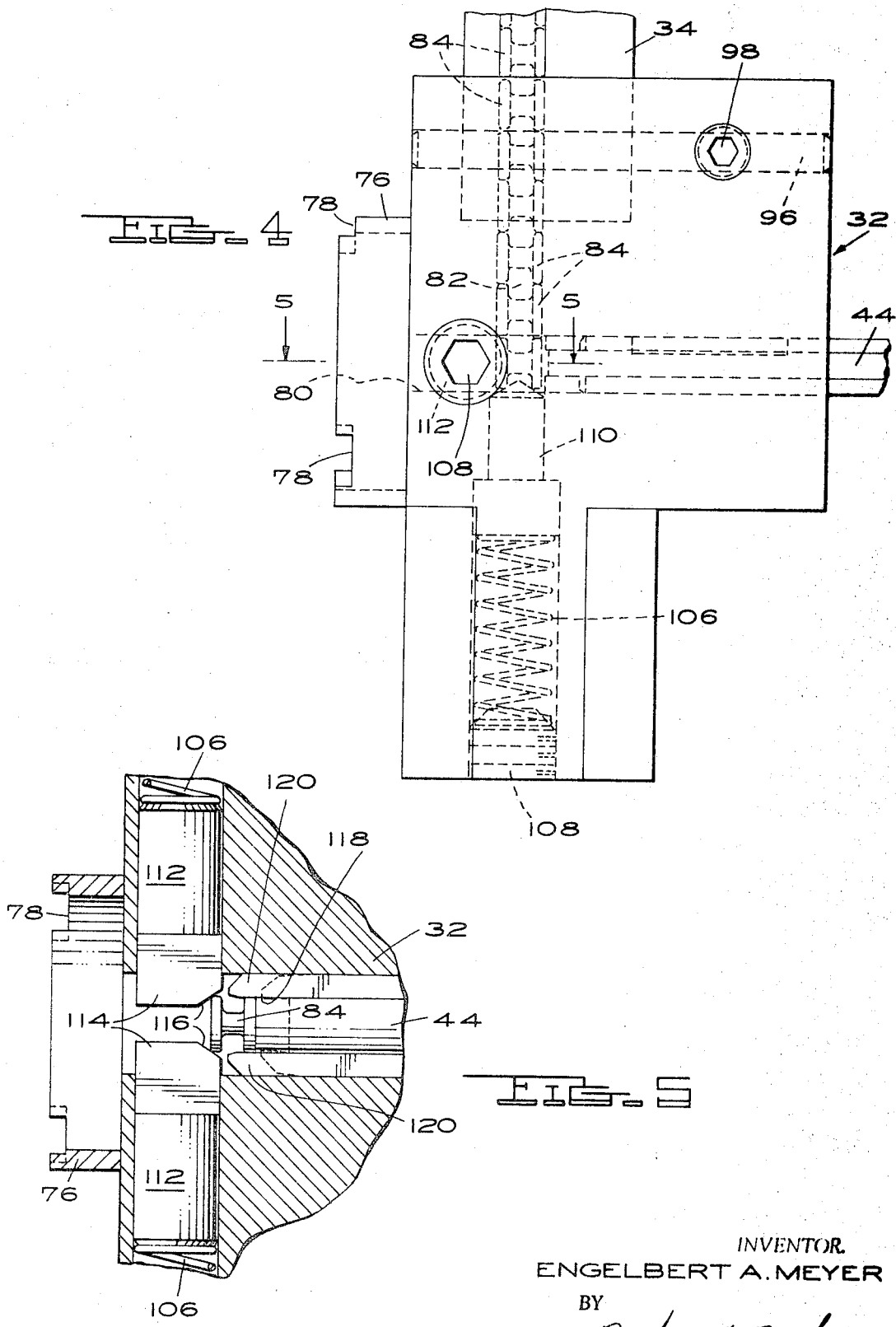

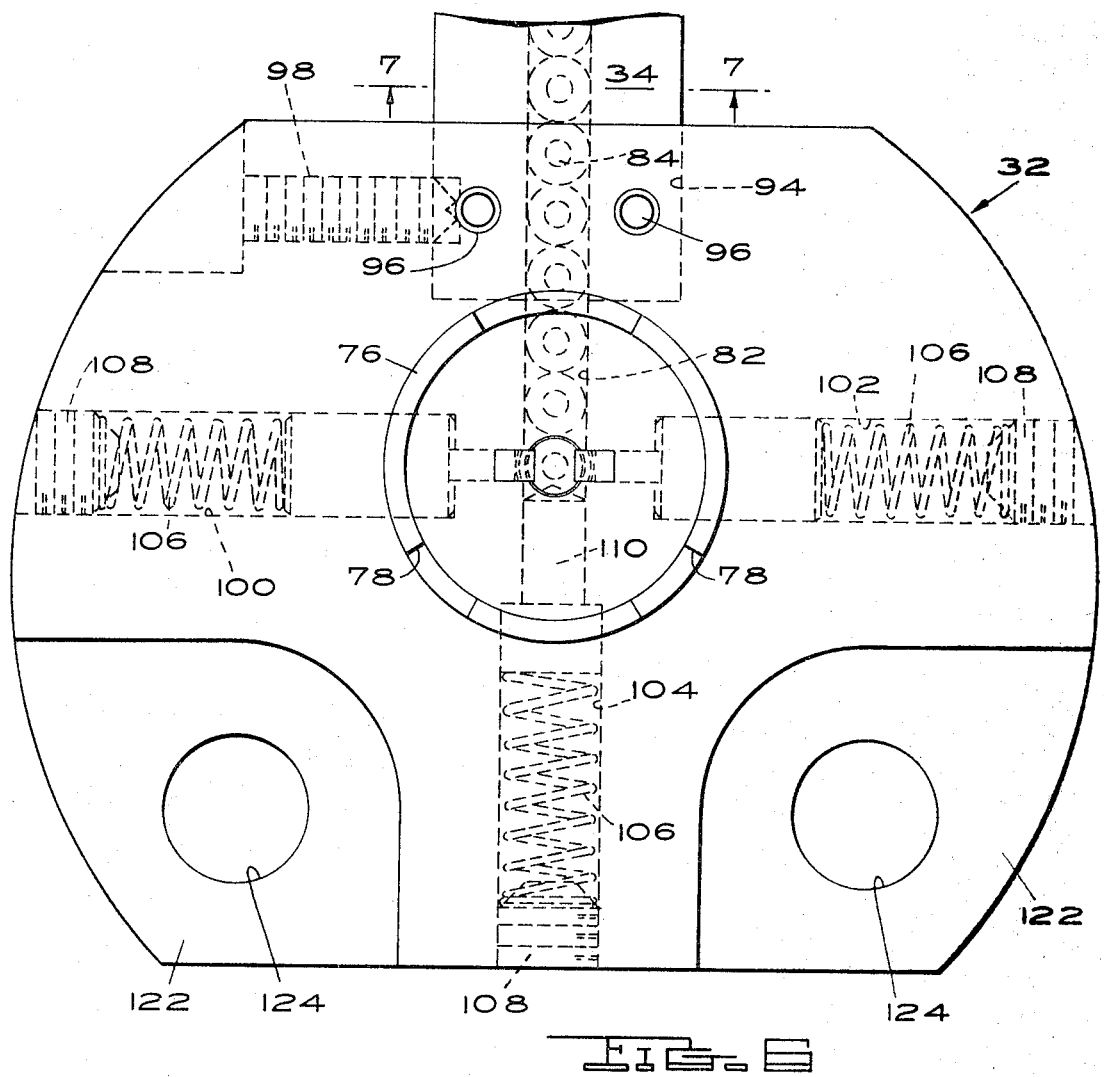
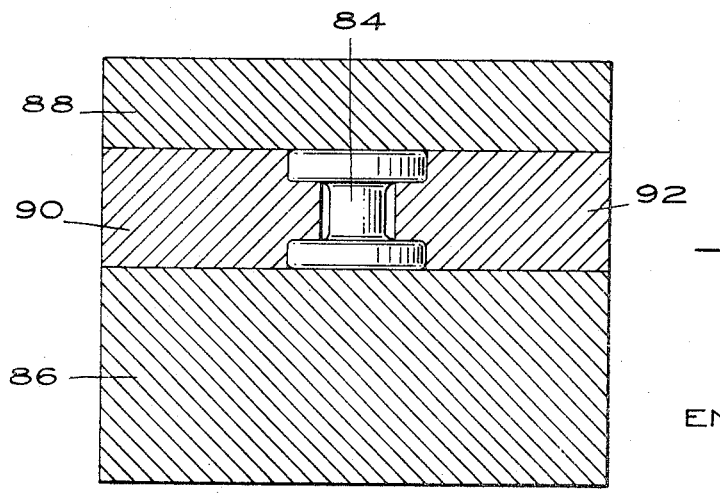

SELF-LOADING STUD WELDING APPARATUS

This invention relates to electric welding apparatus, and in particular to a welding gun equipped to perform a welding function repeatedly and mechanism for supplying a feed of studs, buttons or the like to the gun for welding to a surface such as the exterior surface of an automobile for example.

It is a general object of the invention to provide a fully automatic welding apparatus for welding small elements to panels including a welding gun and a feed system for the elements and control means for establishing and maintaining a repetitive cycle of operation.

Another object is to provide a feed apparatus for feeding the elements such as buttons or the like to a position alined with the welding electrode to be thereafter picked up by the electrode for welding to the panel. This feed apparatus includes passageway means having button retaining elements so arranged that the button will be retained in properly oriented position for subsequent welding when the electrode is shifted into contact with the button.

A further object is to provide a welding apparatus for welding buttons to metal panels wherein buttons are fed to the welding gun or the like in succession for pick up by a reciprocable electrode part, and control means are provided operable to retract the electrode after each welding cycle to pick up another button and thereafter extend the electrode into welding position.

It is to be understood that the term "gun" as used herein refers to the welding mechanism in its generic sense, and is intended to include any suitable welding device capable of operating as set forth herein. It is not restricted to the so-called pistol type gun shown in the drawings, as such has been used for convenience of illustration.

Other objects, advantages and meritorious features will more fully appear from the following specification, claims and accompanying drawings, wherein:

FIG. 3 is a vertical sectional view taken through the welding gun which comprises a part of the apparatus of FIG. 1;

FIG. 4 is an enlarged side elevation of the manifold block comprising a part of the feed system of the apparatus embodying the invention;

FIG. 5 is a cross-sectional view taken along line 5–5 of FIG. 4;

FIG. 6 is a front elevation of the manifold block shown in FIG. 4; and

FIG. 7 is a cross-sectional view taken along line 7–7 of FIG. 6.

Figure 1:
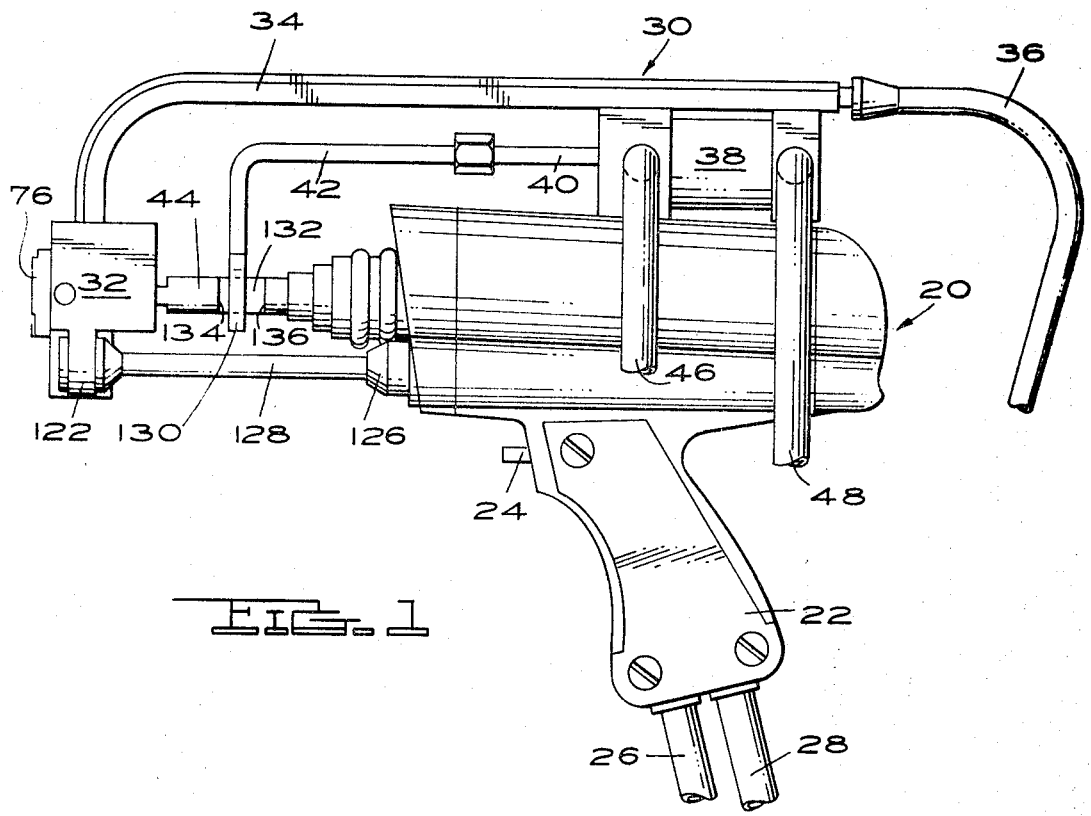
FIG. 1 is a side elevation of a welding apparatus embodying the invention.

Referring now more particularly to the drawings, there is shown in FIG. 1 a welding apparatus including a welding gun or the like 20, which is for convenience shown as a conventional "pistol" type gun. However, it will be understood by those skilled in the art that the gun 20 could be of other physical form, retaining the essential operating structure referred to herein. The gun 20 has a pistol grip handle 22 with an actuating button or trigger 24, with electrical leads 26 and 28 supplying power to the gun.

A button feed assembly 30 is provided which includes a manifold block 32, rigid feed conduit 34 and flexible hose 36. Also included is a fluid pressure operated cylinder 38 having a piston rod 40 coupled to an L-shaped rod 42 which is provided at its forward end with a clevis portion 43 embracing the welding electrode 44 projecting axially from the gun 20. Cylinder 38 is shown as double acting, being fed with fluid pressure through lines 46 and 48 at opposite ends.

Referring now to FIG. 3, which shows the internal parts of the gun 20, it can be seen that the electrode 44 includes a blocklike rear end 50 coupled as by screws 52 to electric lead 28. Insulative block 54 is screwed to electrode end 50 and in turn carries rod 56 which is reciprocably guided in sleeve 58 and guide block 60. An apertured plate 62 surrounds a sleeve 64 rigidly held on rod 56 by a shoulder thereon as shown, and plate 62 is biased forwardly by spring 66. A member 68 mounted on sleeve 58 has a forwardly extending arm portion 70 terminating in a hook 72 overlying plate 62. An electric coil 74 is provided within which sleeve 58 and rod 56 are positioned for reciprocal movement, as described more fully hereinafter.

In FIGS. 4—7 inclusive various structural details of the manifold block 32 and associated parts are shown. The forward end of block 32 has a ring 76 mounted thereon having spaced cutout portions 78. The forward edge of the ring is held against the panel onto which the buttons are to be welded and serves both as a locating means and as a shield for the electric arc struck during welding. Block 32 has a horizontal passage 80 sized to slidably accommodate electrode 44 and a vertical delivery passage 82 terminating at passage 80 through which buttons, studs or the like 84 are delivered. Passage 80 and the forward portion of electrode 44 are preferably of corresponding polygonal shapes to prevent unwanted rotation of the electrode with respect to the passage. Passage 82 is preferably of a configuration corresponding to the shape of the buttons 84 so that the latter are retained in proper alinement therewithin. The delivery conduit 34 is also of the same configuration, and may comprise a pair of spaced plates 86 and 88 between which are secured the two members 90 and 92 shaped to conform to button 84 as shown in FIG. 7. Of course this is merely illustrative of the structure adapted to handle buttons of H shape, and it will be apparent to one skilled in the art that different shapes can be effectively handled by providing variously configured conduits and the like. As shown in FIGS. 4 and 6, the upper end of block 32 is recessed at 94 to receive the end of delivery means 34 and dowels 96 are provided to secure member 34 in place, with suitable set screws 98 bearing against the dowels to retain them in proper position.

Block 32 is provided with three bores 100, 102 and 104 spaced 90° from each other, each of which have a coil spring 106 therein adjustably retained therein by a setscrew 108. Bore 104 is alined with passage 82 and houses a cone-pointed member 110 urged upwardly against the shoulder of the bore by the spring 106. Bores 100 and 102 are horizontally alined with passage 80 and are likewise spaced slightly forward of vertical passage 82, and each houses an identical retainer 112 having a cross-sectionally rectangular end portion 114. The rearwardly disposed corner of each portion 114 is chamfered as at 116 (see FIG. 5), and as a button 84 drops down into passage 80, it seats on member 110 and is yieldingly retained between the surfaces 116 on members 112 as shown.

Electrode 44 has a forward end recessed as at 118 to form diametrically opposed fingers 120 shaped to engage and releasably support a button for welding. Electrode 44 is initially spaced rearwardly of passage 82 as shown in dotted outline in FIG. 5, and upon forward shifting of the electrode 44, it picks up a button 84 and carries it against the panel or the like onto which it is to be welded. As the electrode 44 move forward carrying the button 84, member 110 and the pair of members 112 are shifted against the bias of their respective springs 106 to allow the button and electrode to pass therebetween.

The lower end of block 32 is provided with two flanges or ears 122 each apertured as at 124 in FIG. 6. Projecting from the front end of gun 20 are two internally threaded members 126, one of which is shown in FIGS. 1 and 3. Into each member 126 is screwed a stud 128 having on the opposite end thereof a fastening means 130 projecting through an aperture 124 and coupled to the block 32. This assembly serves to support the block 32 in rigid spaced relation in front of the gun 20. The conduit 34 is secured to the cylinder 38 and at its outer end to block 32 and assists in maintaining the block in proper position.

Turning to FIG. 1, the electrode 44 is preferably provided with an undercut 132 defining shoulders 134 and 136 against one of which the clevis portion 43 of rod 42 abuts during its movement to shift the electrode 44. The gun shown herein is of the type generally known as arc guns. In welding studs and the like to plates by the arc method, the stud is first held against the plate and then withdrawn from the plate while current is passed therebetween to strike an arc, softening or melting the stud and plate, and the stud is then plunged back against the plate to complete the weld. The retraction of the stud from the plate to effect the striking of the arc is referred to as the "lift" of the gun electrode, and is effected by energization of coil 74 attracting the sleeve 58 thereinto. This facet of gun operation is well known in the prior art.

In order to permit the gun 20 to function properly, i.e., to lift the electrode 44 during the welding cycle to strike an arc, the electrode must be free to shift axially a few thousandths of an inch freely and independently of the rod 42. Thus the provision of the clevis 43 and the electrode undercut 132 as described hereinabove, which permits the electrode 44 limited shiftable movement.

To operate the welding apparatus a plurality of the buttons 84 are fed from a suitable supply (not shown) through flexible tube 36 and conduit 34 to the block 32. The button may be fed to the block in any convenient manner as by compressed air. Electrode 44 is retracted to a position spaced rearwardly of passage 82 by rod 42, permitting a button to enter passage 80 for pick up by the electrode as it moves forward. In FIG. 1 the electrode is shown in its forward position. To retract the electrode, line 46 is pressurized to shift piston rod 40 and rod 42 rearwardly, and when rod portion 43 abuts shoulder 136 of electrode 44, the latter is shifted rearwardly far enough to allow a button 84 from passage 82 to drop into passage 80. Pressurization of line 48 shifts rod 42 forwardly, and spring 140 urges electrode 44 forwardly, picking up a button in collet 118 (see FIG. 5) and continuing forward until the button abuts the panel to which it is to be welded. With the button in welding position, i.e., against the panel, the clevis portion 43 of rod 42 is spaced slightly behind shoulder 134 on electrode 44 to accommodate electrode "lift" without interference.

Figure 2:
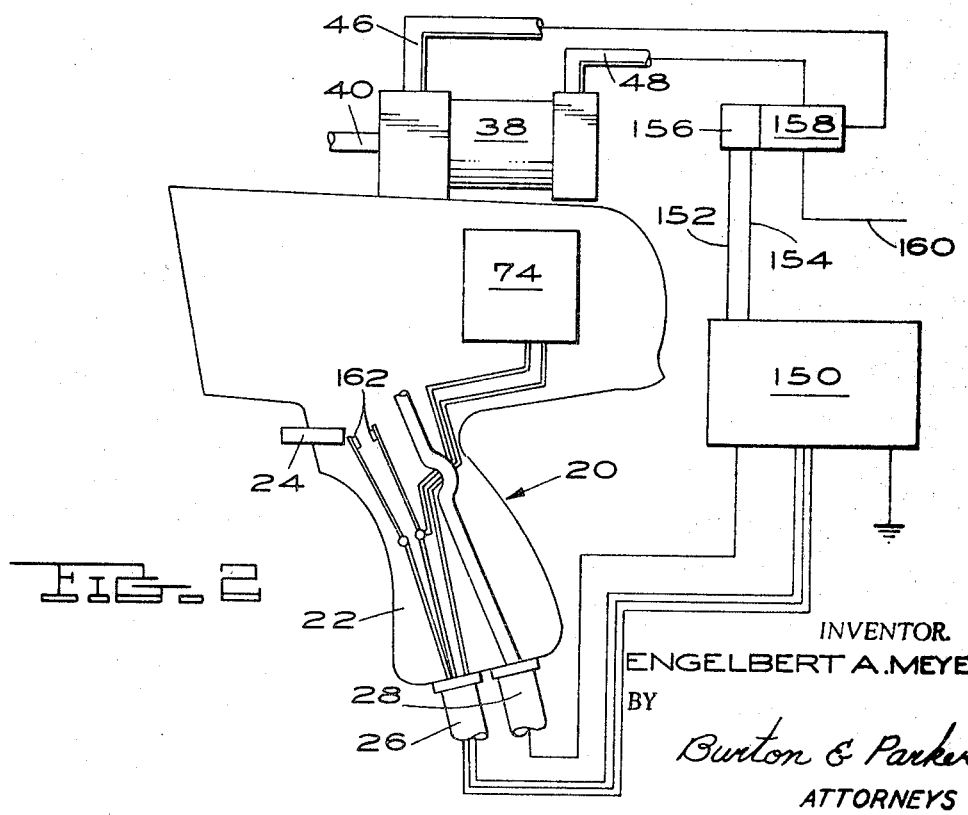
FIG. 2 is a schematic diagram of the electrical and pneumatic control circuitry for the apparatus of FIG. 1.

Shown in FIG. 2 is schematic of the control circuitry for the apparatus. A controller generally shown at 150 includes a transformer and associated electric circuitry for controlling the welding cycle, and also houses a time delay relay coupled through lines 152 and 154 to a solenoid 156 controlling operation of a two-way spring-return fluid pressure valve 158. Fluid pressure supply line 160 leads from a source (not shown) to valve 158, and the valve is coupled to lines 46 and 48 connected to opposite ends of cylinder 38.

Assuming the electrode 44 to be in welding position holding a button 84 against a panel, depression of trigger 24 closes contacts 162, energizes line 28 to supply current through the electrode and button and in turn energizes solenoid coil 74 to complete the "stored arc" welding cycle. Time delay relays of control 150 is also energized, and at the expiration of the time interval, which occurs after the welding cycle is complete, solenoid 156 is energized to shift valve 158, pressurizing line 46 to shift the electrode rearwardly to pick up another button, and thence forwardly again upon deenergization of solenoid 156 which permits valve 158 to return to a position admitting fluid to rear of cylinder 38 through line 48.

There is thus shown s system capable of welding successive buttons, studs or the like to the same panel or to successive panels such as automobile body members or the like without the necessity of manually inserting a button into the welding unit for each cycle of operation. The buttons are automatically fed in properly oriented fashion to the device successively, and they are picked up and carried by the electrode to a welding position automatically, at which they are welded to a panel by the mere depression of an actuating means such as the gun trigger.

I claim:

1. In a self-loading gun for welding buttons or the like to metal surfaces, a gun body, an electrode mounted in the body for reciprocal movement having a projecting button holding forward end portion, a manifold block supported in spaced relation to said gun body having a longitudinal bore therethrough accommodating said electrode forward end and a transverse button passage communicating with said bore intermediate opposite ends of the latter, button delivery means for delivering buttons to said button passage, motive means on the gun body coupled to said electrode through a lost motion connection intermediate the gun body and the manifold block operable to shift the electrode between a forward welding position and a rearward button loading position adjacent said passage, a solenoid on the gun body coupled to said electrode means operable independently of said motive means to momentarily retract the same to strike an arc between a button carried thereby and a metal surface to which the button is to be welded, means on the gun body for plunging the button against said metal surface after retracting by said solenoid, and control means coupled to said gun and to said motive means causing the latter to shift the electrode rearwardly to load a button thereon and thence forwardly to dispose the button at a welding position upon the expiration of each welding cycle.

2. The invention defined in claim 1 characterized in that at least one yieldably biased member is disposed within said manifold block and projecting into said bore adjacent said passage to retain a button delivered through the passage into the bore in proper position for pickup by said electrode during its forward movement.

3. The invention defined in claim 1 characterized in that a rigid button supply conduit shaped in cross section conforming to button profile for supplying buttons in a direction transverse to their axis is mounted on said gun body communicating at one end with said manifold passage and at its opposite end with said button delivery means.

4. The invention defined in claim 1 characterized in that said motive means comprises a fluid pressure operated motor mounted on said gun body having a piston rod coupled to said electrode through a lost motion connection, and said connection includes a pair of longitudinally spaced abutment shoulders on said electrode and a clevis-shaped end portion on said piston rod embracing the electrode intermediate said shoulders.